United States Patent [19]

Subramanian

[11] Patent Number: 5,096,964
[45] Date of Patent: Mar. 17, 1992

[54] BLOW MOLDABLE POLYACETAL COMPOSITIONS

[75] Inventor: Pallatheri M. Subramanian, Hockessin, Del.

[73] Assignee: E. I. Du Pont de Nemours and Company, Wilmington, Del.

[21] Appl. No.: 435,827

[22] Filed: Nov. 9, 1989

Related U.S. Application Data

[63] Continuation of Ser. No. 164,451, Mar. 4, 1988, abandoned.

[51] Int. Cl.[5] .................. C08L 59/00; C08L 27/18
[52] U.S. Cl. ................................. 525/57; 525/58; 525/154; 525/155
[58] Field of Search .................. 525/57, 58, 154, 155

[56] References Cited

U.S. PATENT DOCUMENTS

| 3,005,795 | 10/1961 | Busse et al. | 260/45.5 |
| 3,310,608 | 3/1967 | Matsubayashi et al. | 260/897 |
| 4,041,002 | 8/1977 | Aboshi et al. | 260/30.6 |
| 4,766,168 | 8/1988 | West | 525/58 |

FOREIGN PATENT DOCUMENTS

| 242176 | 10/1987 | European Pat. Off. | 525/57 |
| 047037 | 3/1983 | Japan | 525/57 |

Primary Examiner—John C. Bleutge
Assistant Examiner—David Buttner

[57] ABSTRACT

A melt blend of a polyacetal, an ethylene-vinyl alcohol copolymer, and a fibrillatable fluoropolymer resin. The blends are blow moldable.

4 Claims, No Drawings

BLOW MOLDABLE POLYACETAL COMPOSITIONS

This application is a continuation of U.S. patent Ser. No. 07/164,451, filed Mar. 4, 1988 now abandoned.

BACKGROUND OF THE INVENTION

Polyacetal compositions generally are understood to include homopolymers of formaldehyde as well as copolymers of formaldehyde with other monomers that yield oxyalkylene groups having two or more carbon atoms in the main polymer chain. Polyacetals possess a desirable balance of physical properties including high stiffness, toughness, low coefficient of friction and good solvent resistance. Polyacetals are commercially available in a range of viscosities which are suitable for forming finished articles by compression molding, injection molding and extrusion. However, even the most viscous commercially available polyacetals are not suitable for the preparation of larger finished articles (i.e., larger than a few 100 cc) by extrusion blow molding.

This is unfortunate because many hollow articles such as containers and complex automobile parts; e.g., air ducts, are difficult and expensive to manufacture by compression or injection molding. Of course, such hollow articles are readily and economically made by blow molding from polymers having melt rheologies that are suited to blow molding.

Thus a need exists for polyacetal compositions which are readily processible by blow molding techniques and which at the same time substantially retain the outstanding properties associated with polyacetals.

SUMMARY OF THE INVENTION

Acetal polymers which are readily processed by blow molding are provided by the following composition which is a melt blend of a mixture consisting essentially of:
(a) 85–97 parts by weight of a polyacetal having a melt flow rate at 190° C. not greater than about 5 grams/10 minutes as measured by ASTM D 1238 (2160 g load);
(b) 2–15 parts by weight of an ethylene-vinyl alcohol copolymer containing 10-60 mole percent ethylene; and
(c) 0.1–2 parts by weight of a fibrillatable fluoropolymer resin.

These compositions are readily blow molded to yield hollow finished articles which exhibit the desirable properties associated with acetal polymers. The use of the ethylene-vinyl alcohol copolymer in combination with the fibrillatable fluoropolymer resin as additives is critical in achieving good blow moldability while retaining the physical properties of the acetal polymer. Excessive amounts of either additive, while possibly aiding processibility by blow molding, seriously decrease the level of physical properties exhibited by the molded articles.

DETAILED DESCRIPTION OF THE INVENTION

As indicated above, the polyacetal can be either a homopolymer, a copolymer or a mixture thereof. Copolymers can contain one or more comonomers, such as those generally used in preparing polyacetal compositions. Comonomers commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively. The polyacetals used can be linear or branched.

Polyacetals useful in the present invention should have a melt flow rate not greater than about 5 g/10 minutes at 190° C. by ASTM-1238 using a 2160 g load. Polymers having a melt flow rate not greater than 2 g/10 minutes are especially preferred. For purposes of the present invention, there is no lower limit to the value of the melt flow rate; however, there are practical limits set by the difficulty of preparing polyacetals having a molecular weight high enough to correspond to a melt flow rate of less than about 0.1 g/10 minutes. The invention is not to be limited to polyacetals having melt flow rates greater than about 0.1 g/10 minutes because advances in the polyacetal field may eventually permit the economical preparation of higher molecular weight products than those now available.

An ethylene-vinyl alcohol copolymer makes up component (b). It may prepared by saponification of ethylene-vinyl acetate copolymer. The degree of saponification is preferably greater than 95% and most preferably greater than 99%. Commercial grades of ethylene-vinyl alcohol copolymers may be contaminated with minor amounts of impurities such as sodium acetate or ferric chloride and zinc chloride. Some polyacetals are generally degraded by acidic materials and acetate-capped polyacetals are sensitive to basic materials and in this case it is desirable to use ethylene-vinyl alcohol copolymers containing less than 10 ppm total of such impurities.

The molecular weight of the ethylene-vinyl alcohol copolymers is not critical to the success of the invention; however the use of copolymers which have melt flow rates similar (within a factor of 10) to those of the polyacetal resin facilitates mixing of the two polymers during preparation of the compositions of the present invention. The molar proportions of ethylene and vinyl alcohol units in the ethylene-vinyl alcohol copolymer is more important. The ethylene-vinyl alcohol copolymer should contain 10–60 mole percent ethylene, with polymers containing 15–40 mole percent ethylene being preferred.

Component (c), the fibrillatable fluoropolymer resin, is preferably a non-melt-fabricable-tetrafluoroethylene polymer. The tetrafluoroethylene polymers are made by an emulsion polymerization process, in which the polymer particles formed remain dispersed in the reaction mix during the polymerization. The particles may be coagulated and dried. The particles fibrillate while being physically mixed into the composition of the invention.

The fibrillatable polytetrafluoroethylene (PTFE) is a well known material in the art and readily available as a commercial product. Fibrillatable PTFE is commercially available in the form of aqueous dispersions prepared by emulsion polymerization or in the form of a powder obtained by separation of the resin from the aqueous dispersion followed by drying. Aqueous dispersions of fibrillatable PTFE contain up to 60% of PTFE particles having a diameter of about 0.2 um while the powdery products are agglomerates of those particles, having a diameter of about 0.5 mm. The PTFE particles of either form can be readily converted into fibrils when the particles are subjected to the mechanical shearing forces required to make the present compositions.

Several examples of commercially available fibrillatable PTFE are as follows: Teflon ® 6J (a product of Mitsui Fluorochemical Co.), Teflon ® 6JC (a product by the same company), Polyflon ® F103 or F201 (products of Daikin Kogyo Co.) are all examples of the powdery products, and Teflon ® 30-J (a product of Mitsui Fluorochemical Co.) and Polyflons ® D-1 and D-2 (products of Daikin Kogyo Co.) are examples of the aqueous dispersion product.

The amounts of ethylene-vinyl alcohol copolymer, (b), and fibrillatable PTFE, (c), used in the present compositions are largely functions of the melt flow rate of the starting polyacetal and the difficulty of the blow molding operation being undertaken. With polymers having melt flow rates approaching 5 g/10 minutes at 190° C., the ethylene-vinyl alcohol copolymer would usually be employed in amounts of about 9-15 parts in combination with 0.5-1.5 parts of fibrillatable PTFE. For polyacetals having a melt flow rate of about 1 g/10 minutes at 190° C., useful compositions are obtained with 3-10 parts of ethylene-vinyl alcohol copolymer in combination with 0.2-1.0 part of fibrilla-table PTFE. For polyacetals having melt flow rates less than 1.0 g/10 minutes, even smaller amounts of additives can be used. For difficult blow molding applications involving the molding of very large parts or complex parts, components (b) and (c) generally would be added in amounts approaching the upper limits of the ranges suggested above.

Preparation of the compositions of this invention is accomplished by dispersing the ethylene-vinyl alcohol copolymer and the fibrillatable PTFE uniformly throughout the polyacetal by melt blending. Melt blending is customarily effected in a melt extruder and may be carried out in a separate step prior to blow molding or carried out directly in the blow molding equipment if it is equipped with a screw that provides adequate mixing. In either case, a dry blend of components (a), (b), and (c) is usually fed to the mixing screw. It is possible, however, to add components (b) and (c) in sequence to the polyacetal if so desired. For instance, a melt blend of polyacetal and ethylene-vinyl alcohol copolymer might be prepared first to which PTFE would be added in a later mixing step. If the composition of the invention is formed in a separate melt blending step, it is convenient to pelletize the material by extruding a strand which is quenched, cut and dried. Such pellets are suitable for use in blow molding operations with blow molding machines (e.g., made by Rocheleau, Inc., Hayssen, Inc., etc.) and can be readily fabricated into hollow articles such as containers.

Other additives as are known to those familiar with polymer compounding may be included in the composition. These additives include toughening agents, plasticizers, stabilizers, antioxidants, flame retardants, reinforcing agents such as glass fiber and flake, mineral fillers, ultraviolet light stabilizers, etc.

EXAMPLES

Example 1A

A dry blend is prepared from 90 parts by weight of acetate-capped acetal homopolymer resin powder having a melt flow rate of 1.0 g/10 minutes at 190° C., 10 parts by weight of ethylene-vinyl alcohol copolymer pellets containing 29 mole percent ethylene, an ash content of less than 10 ppm and having a melt flow rate of 9 g/10 minutes at 215° C., 0.5 part by weight of granular fibrillatable PTFE (Teflon ® 60) and 0.1 part by weight of triethylene glycol bis[3-(3'-tert-butyl-4'-hydroxy-5'-methylphenyl) propionate], an antioxidant, by tumbling the mixture in a polyethylene bag. The dry blend is melt blended by passage through a single screw extruder at a barrel temperature setting of about 200° C. The extrudate is stranded, quenched and cut to form pellets.

The compounded pellets are used for blow molding in an extrusion blow molding machine manufactured by the Rocheleau Tool and Die Company fitted with a 1 liter bottle mold. A screw temperature of 190° C. and a die temperature of 200° C. are employed. The extruded material has good melt strength as evidenced by no sagging of the parison. Good 1-liter bottles can be made consistently with the polyacetal composition of this example.

The flexural modulus of an injection molded test bar of this composition is 478,000 psi.

Example 1B

Example 1A is repeated with the exceptions that 95 parts by weight of the acetal homopolymer is used with 5 parts by weight of the ethylene-vinyl alcohol copolymer. One-liter bottles are readily blow molded with this composition.

The flexural modulus of an injection molded test bar of this composition is 449,000 psi.

Control Example 1

A melt blend of 99 parts by weight of the acetal homopolymer used in Examples 1A and 1B, 0.15 part by weight of a terpolyamide stabilizer consisting of nylons 6/6, 6/10 and 6 in a weight ratio of 34/23/42 and 0.1 part by weight of the antioxidant used in Examples 1A and 1B is prepared in an extruder as in Examples 1A and 1B. Using this resin, attempts to prepare 1-liter bottles on the Rocheleau blow molding machine are unsuccessful. The resin has inadequate melt strength evidenced by sagging of the parison.

The flexural modulus of an injection molded test bar of this composition is 412,000 psi.

Example 2A

A dry blend is prepared from 95 parts by weight of acetate-capped acetal homopolymer resin having a melt flow rate of 0.63 g/10 minutes at 190° C., 5 parts by weight of ethylene-vinyl alcohol copolymer pellets containing 29 mole percent ethylene and having a melt flow rate of 9 g/10 minutes at 215° C., 0.5 part by weight of granular fibrillatable PTFE (Teflon ® 60) and 0.2 part by weight of the antioxidant used in Examples 1A and 1B by tumbling the mixture in a polyethylene bag. The dry blend is melt blended by passage through a single screw extruder at a barrel temperature setting of 200° C. The extrudate is stranded, quenched and cut to form pellets.

The compounded pellets are used for blow molding in a continuous extrusion blow molding machine (VK 1.4 Battenfeld Fischer) fitted with a mold for a 2.5 liter handle ware container. The handle ware container is typical of flattened containers with a handle which are used for a variety of liquid household products such as detergents. Such containers represent a relatively large and complex object to prepare by blow molding. A screw temperature of 190° C. and a die temperature of 200° C. are used. The mold is maintained at about 90° C. Good 2.5 liter handle ware containers can be made consistently with the polyacetal composition of this example.

Example 2B

Example 2A is repeated with a composition made from 97 parts by weight of the acetal homopolymer of Example 2A, 3 parts by weight of the ethylene-vinyl alcohol copolymer of Example 2A, 0.25 part by weight of the powdered PTFE of Example 2A and 0.2 part by weight of the antioxidant of Examples 1A and 1B. Good 2.5 liter handle ware containers can be made consistently with the composition of this example.

Control Example 2

A melt blend of 99 parts by weight of the acetal homopolymer used in Examples 2A and 2B, 1 part by weight of the ethylene-vinyl alchol copolymer used in Examples 2A and 2B and 0.2 part by weight of the antioxidant of Examples 1A and 1B is prepared. The ethylene-vinyl alcohol copolymer is added as a stabilizer for the polyacetal. Using this resin, attempts to prepare 2.5 liter handle ware containers on the same blow molding machine used in Examples 2A and 2B are totally unsuccessful. Because of its low melt strength, the composition is not capable of forming a parison. Even when the feed temperature is lowered from 190° to 170° C., it is impossible to get a parison of sufficient size to attempt blowing this large part.

I claim:

1. Polyacetal melt blend consisting essentially of a mixture of
   (a) 89-96.8 parts by weight of a polyacetal having a melt flow rate at 190° C. about 1 gram/10 minutes or less as measured by ASTM D 1238 at 2160 g load;
   (b) 3-10 parts by weight of an ethylene-vinyl alcohol copolymer containing 10-60 mole percent ethylene; and
   (c) 0.2-1.0 parts by weight of a fibrillatable fluoropolymer resin.

2. The blend of claim 1 wherein the polyacetal is an acetate-capped acetal homopolymer.

3. The blend of claim 1 or 2 wherein the fibrillatable fluoropolymer resin is a non-melt-fabricable-tetrafluoroethylene polymer.

4. Polyacetal melt blend consisting essentially of a mixture of
   (a) 83.5-89.5 parts by weight of a polyacetal having a melt flow rate of about 5 gram/10 minutes or less as measured by ASTM D 1238 at 2160 g load;
   (b) 9-15 parts by weight of an ethylene-vinyl alcohol copolymer containing 10-60 mole percent ethylene; and
   (c) 0.5-1.5 parts by weight of a fibrillatable fluoropolymer resin.

* * * * *